June 14, 1927.  L. D. SOUBIER  1,632,632
GLASS FORMING MACHINE
Filed Aug. 20, 1921  4 Sheets-Sheet 1

INVENTOR
LEONARD D. SOUBIER
BY J. F. Rule
HIS ATTORNEY

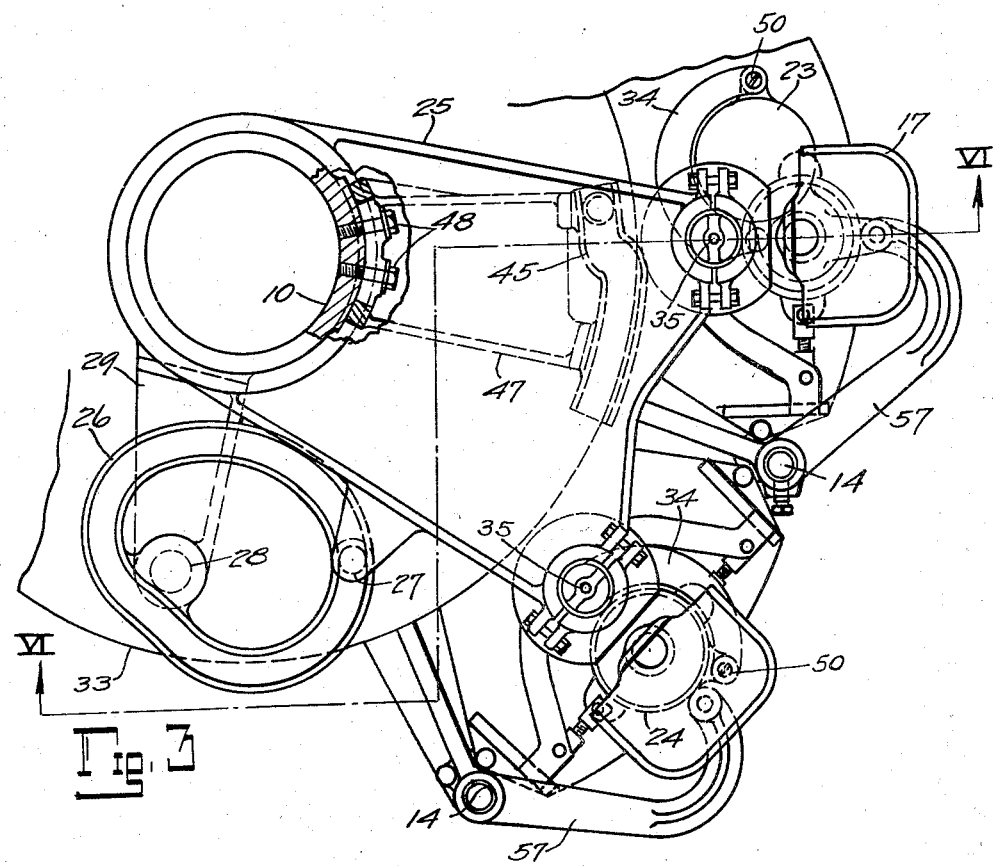
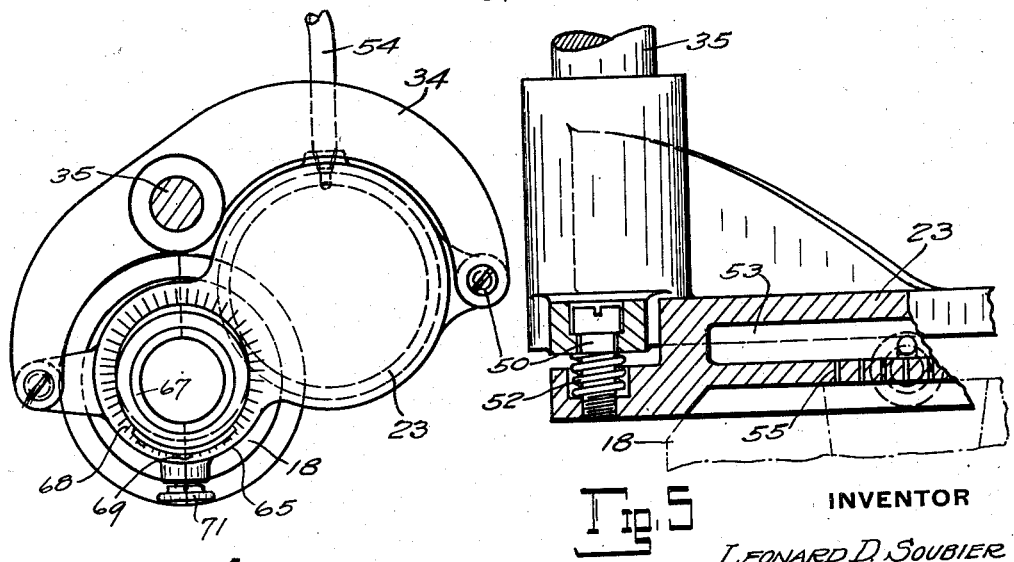

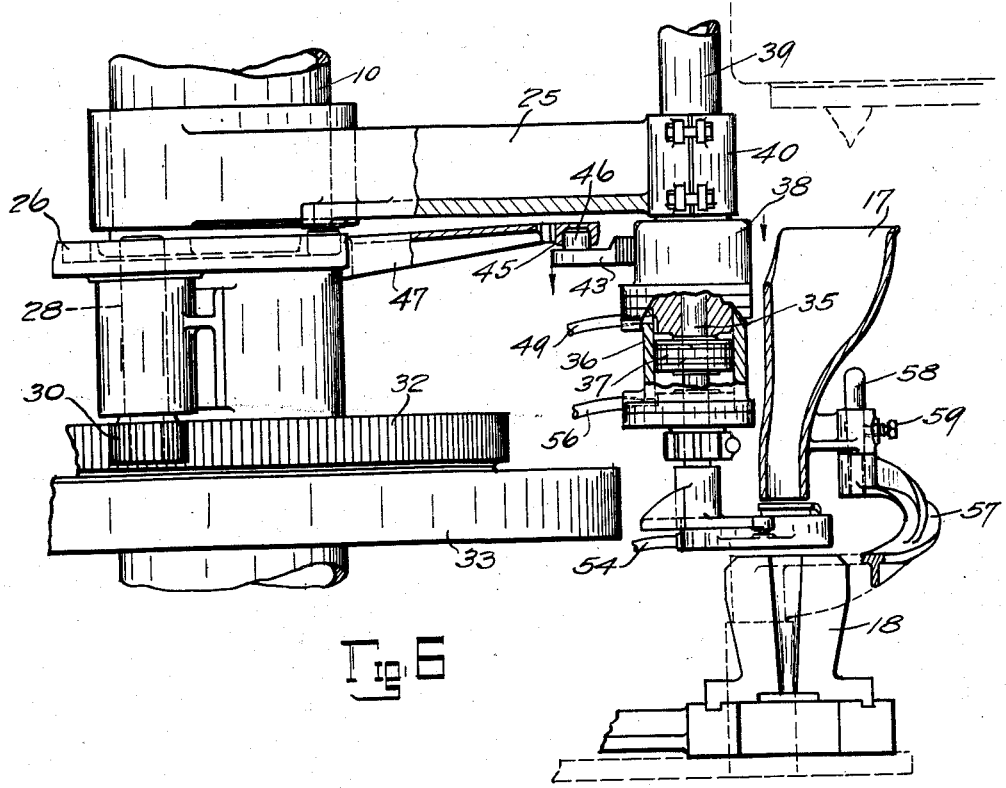
Fig 6
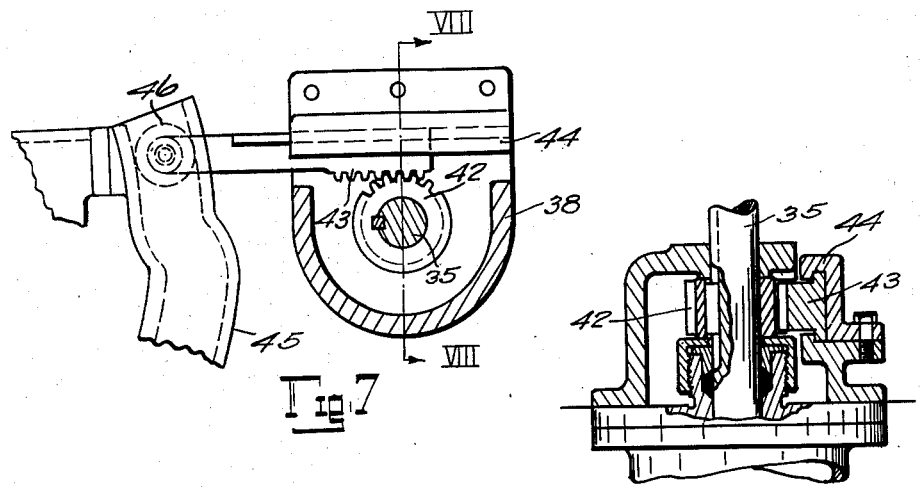
Fig 7
Fig 8
INVENTOR
Leonard D. Soubier
BY J. F. Pule
HIS ATTORNEY

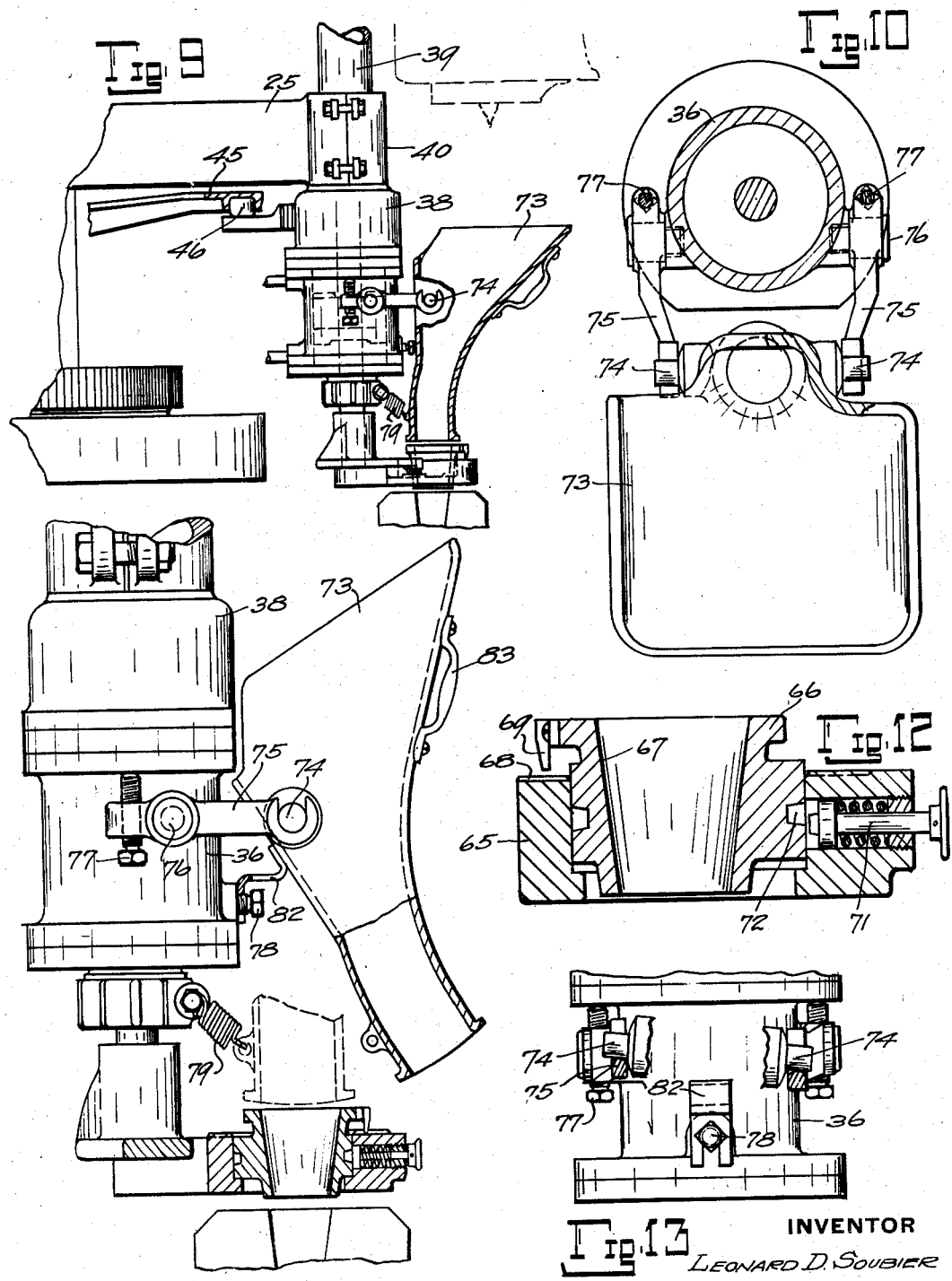

Patented June 14, 1927.

1,632,632

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed August 20, 1921. Serial No. 493,784.

My invention relates to glass forming machines and is particularly adapted for use with machines having molds open at their upper ends to receive charges of hot glass. With machines of this type, particularly where the mold carriage is rotated continuously, there is sometimes provided a funnel or guide over the mold to direct the charges of glass into the mold while the carriage is running. After a charge has entered the mold, a blowing head or other closure may be brought into position over the open end of the mold to assist in the further operations on the glass therein.

An object of my invention is to provide a practical means for bringing such head or closure into position without interference with the funnel or guide and without the necessity of moving the latter out of its operative position over the mold. In its preferred form, the invention comprises a mold closing head or heads arranged to advance with the molds, together with means for moving said head or heads laterally relative to the molds into and out of operative position. The funnel guide may be spaced above the mold a sufficient distance to permit the mold closing head to move into and out of position between the mold and said guide.

Other features of the invention will appear hereinafter.

In the accompanying drawings:

Figure 3 is a similar view on a larger scale, showing the parts more in detail.

Figure 4 is a plan view showing a mold and a blowing head withdrawn to permit a charge of glass to enter the mold.

Figure 5 is a fragmentary part sectional view of a blowing head.

Figure 6 is a part sectional elevation of a portion of the machine at the plane of the section line VI—VI on Figure 3.

Figure 7 is a fragmentary plan view of the means for shifting the head relative to the mold.

Figure 8 is a sectional view at the plane of the line VIII—VIII on Figure 7.

Figure 9 shows a modification wherein the funnel guide is mounted on the oscillating frame 25.

Figure 10 is a part sectional plan of the same.

Figure 11 is a view of parts shown in Figure 9, but on a larger scale, and shows the main funnel swung outward to deflect the charges of glass away from the molds.

Figure 12 is a sectional elevation of the auxiliary funnel.

Figure 13 is a detail indicating the adjustable mountings for the main funnel.

Figure 1:
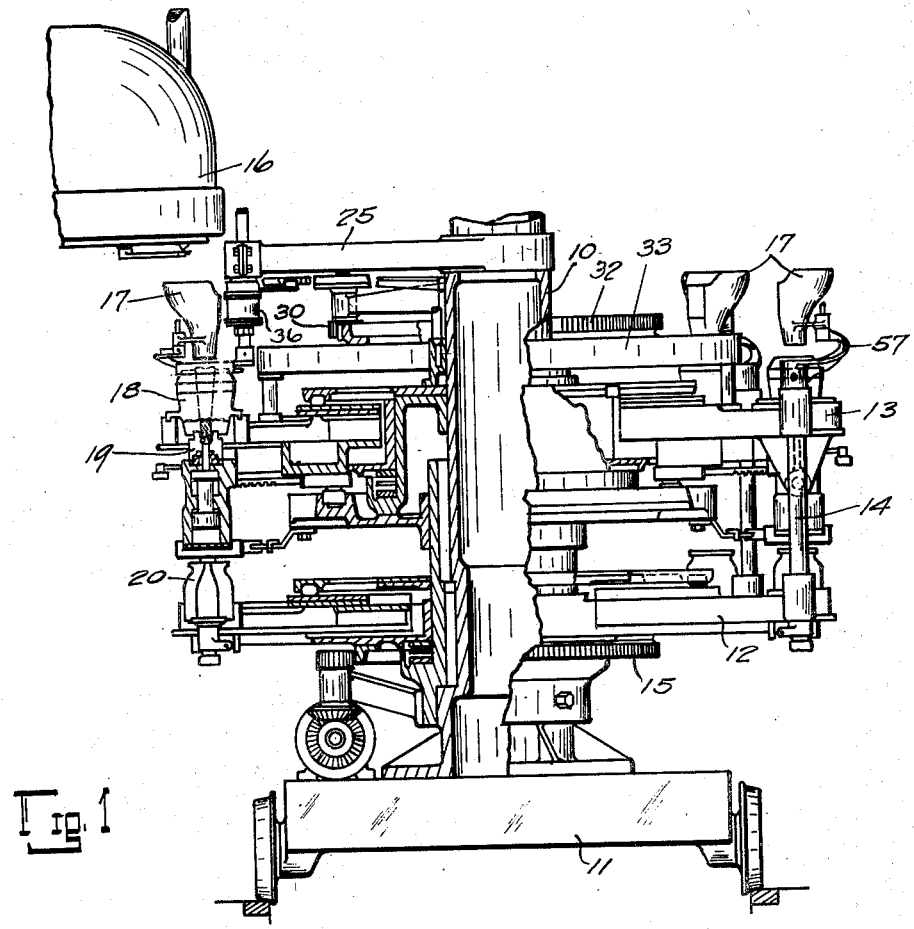
Figure 1 is a part sectional elevation of a glass blowing machine to which the present invention is applied.
Figure 2:
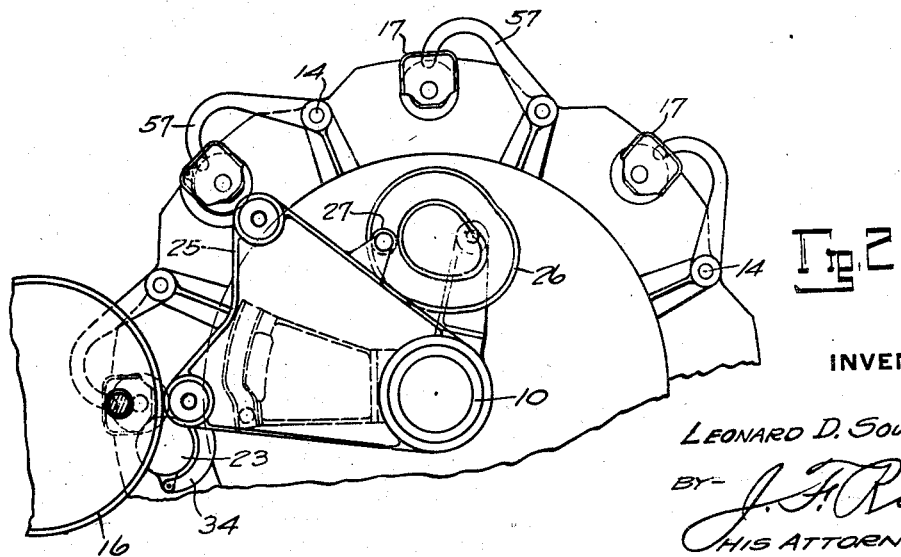
Figure 2 is a fragmentary top plan view of a portion of the machine.

The invention is herein shown as applied to a continuously rotating bottle blowing machine of the Graham type, such as disclosed in the co-pending application of Richard La France, Serial Number 420,905.

The machine comprises a central stationary column 10 mounted on a wheel base 11. The mold carriage comprises lower and upper frames or spiders 12 and 13 respectively, connected by vertical standards 14. A ring gear 15 on the carriage is connected through gearing to a motor for rotating the carriage continuously about the stationary column 10. Charges of glass may be supplied from a boot or extension 16 of the furnace, provided with suitable feeding apparatus by which individual charges of glass are delivered and dropped through funnel guides 17 into parison molds 18. Each charge is partially formed in the parison mold, which then opens, leaving the parison supported in a neck mold 19. The latter is then inverted to swing the parison into a finishing mold 20 in which it is blown to finished form.

After a charge has been dropped into the mold 18, a blowing head is brought into position to close the upper end of the mold, and air under pressure is supplied through said head to compact the glass in the mold and to assist in forming the neck of the bottle. The blowing head is then withdrawn and a second head or closure plate brought into position to close the upper end of the parison mold. Air is then supplied through the neck end of the mold to blow the glass to hollow form in the parison mold.

The mold closing heads 23 and 24 are carried on a frame 25 mounted to oscillate on the column 10. The oscillating movement is imparted to the frame 25 by means of a cam 26 with which engages a cam roll 27 on said frame. The cam is connected to a shaft 28 mounted in a stationary bracket arm 29. On the lower end of the shaft 28 is a pinion 30 running in mesh with a gear 32 attached to an air spider 33 on the mold carriage, whereby the cam 26 is rotated continuously. This cam is so shaped and is driven at such speed that the frame 25 moves forward at the same angular speed as the carriage through a limited distance while the heads 23 and 24 are in co-operative relation to two adjacent parison molds, and is then returned and advances with the next succeeding molds.

The head 23 is carried on a rock arm 34 fixed to a vertical rock shaft 35. This rock shaft forms the piston rod of an air motor 36 having a piston 37 by which the mold closing head can be moved up and down. The motor casing is secured to a bracket 38 having an integral tubular extension 39 clamped in a sleeve 40 at the outer end of the frame 25. The shaft 35 is rocked by means of a pinion 42 and rack 43 (see Figs. 6, 7 and 8). The rack is mounted to reciprocate in a guide 44 and is actuated by a cam 45 on which runs a roll 46 on the rack bar. Said cam is formed on or secured to the outer end of a stationary arm 47, which arm is adjustably secured by means of set screws 48 to the stationary column 10.

As the frame 25 advances from the Figure 3 position, the cam 45 operates to move the rack outward or away from the center of the machine and thereby rocks the shaft 35 and swings the blowing head 23 inward from the Figure 4 position to a position directly over the parison mold 18. Air under pressure is then admitted through a pipe 49 (Fig. 6) above the piston 37 so that the head 23 is moved downward onto the mold. A yielding connection is provided between the blowing head 23 and its carrying arm 34 (see Figs. 4 and 5), said connection comprising stud bolts 50 and coil springs 52 which permit the head to yield upwardly relative to its supporting arm 34 at either point of connection with said arm. The studs 50 also have a loose connection with their carrying arm 34, permitting a limited lateral movement of the head relative to said arm. It will be noted that with this form of connection the blowing head can automatically adjust itself to the mold 18, thereby insuring a close fit. The blowing head may be provided with an air chamber 53 to which air under pressure is admitted through a pipe 54, perforations 55 being formed in the lower wall of said chamber to admit the compressed air to the mold. The blowing head is lifted from the mold by supplying compressed air through a pipe 56 to the motor 36 beneath the piston. The supply of air to the mold and also the supply for operating the air motor are controlled by automatically actuated valves (not shown) which may be controlled and operated in the same manner as the corresponding valves disclosed in the application Serial Number 420,905 hereinbefore mentioned.

The cover plate or head 24 is also yieldingly mounted on an arm 34 carried by a shaft movable up and down by a piston motor, which may be a duplication of that above described for actuating the blowing head 23. In the particular construction shown, wherein the heads 23 and 24 are mounted on a frame 25, separate from the carriage, it is not necessary to swing the head 24 laterally on its supporting frame as it is not brought into position to interfere with the introduction of the glass to the molds.

Each of the funnels or guides 17 is mounted on an arm 57 which may be secured to the upper end of a standard 14. The funnels may be adjustably mounted on vertical pins 58 on the arms 57 and clamped in position by set screws 59.

Referring to Figures 4 and 12, the head 23 is provided with an extension 65 having a circular opening in which is seated an auxiliary funnel or funnel section 66 having a tapered opening 67 extending therethrough. This opening is eccentrically arranged so that by rotating said section the funnel is adjusted laterally. The part 65 is provided with an annular series of ribs or serrations 68 which co-operate with a detent 69 on the funnel to hold the latter in adjusted position. A spring actuated detent 71 mounted in the extension 65 is adapted to engage an annular recess 72 in the funnel to hold the latter seated after adjustment. Although the auxiliary funnel 65 is useful in accurately guiding the glass into molds having comparatively small openings to receive the glass, it will be understood that there are many conditions of operation in which the auxiliary funnel may be omitted.

Figures 9, 10, 11 and 13 illustrate a modification wherein a funnel 73 is mounted on the oscillating frame 25 and serves to guide the charges of glass into the several blank molds in succession. The funnel is provided with trunnions 74 having bearings in arms 75 fulcrumed at 76 on the motor 36. Adjusting screws 77 permit the arms 75 to be rotatively adjusted about their fulcrums for adjusting the funnel 73 up or down. Also by a relative adjustment of the screws 77, the bearings 74 may be tilted as indicated in Figure 13 to thereby adjust the lower end of the funnel in the direction of its movement with the oscillating frame 25. The funnel is normally held against an adjustable stop 78 by means of a spring 79. By adjusting stop 78 the lower end of the funnel may be adjusted toward or from the center of the machine. It is sometimes desirable to temporarily deflect the gobs or charges of glass away from the molds. For this purpose the funnel 73 may be swung to the Figure 11 position and held in such position by a stop 82 supported on stop 78. The spring 79 may be unhooked from the funnel before it is swung out. The stop 82 can be quickly placed in position, then removed when it is desired to return the funnel to normal position. A handle 83 is provided on the funnel.

The operation will be apparent from the foregoing description, but may be briefly summarized as follows: As the carriage rotates, the parison molds 18 are brought successively beneath the boot 16. The gob forming mechanism operating in synchronism with the machine drops a gob of glass through the funnel 17 into the mold while the funnel is passing beneath the boot. Immediately after the mold receives its charge of glass, the cam 45 operates to rotate the shaft 35 and swing the blowing head 23 laterally to a position over the mold, it being understood that the frame 25 is at this time advancing with the mold. The air motor 36 then operates to lower the blowing head onto the mold and air under pressure is admitted through said head to compress the glass in the mold. The blowing head is then lifted by reversing the air motor, and the frame 25 is returned by its cam 26 so that when it again advances, the blowing head will co-operate in the same manner with the next succeeding mold. While the blowing head is being moved into position on one mold, the cover plate 24 is being moved into position on the next mold in advance of said blowing head. When the cover plate is in position, the parison is blown to hollow form. The succeeding operations on the glass form no part of the present invention and need not here be described.

Modifications may be resorted to within the spirit and scope of my invention.

What I claim is:

1. In a glass forming machine, the combination of a mold carriage, means to drive it, molds thereon open at their upper ends to receive charges of glass, a closure for the molds, means to move said closure laterally into and out of a position over the path of the molds, means to cause the closure to travel with each mold while in said position and then return for travel with the next succeeding mold, and means to move said closure vertically into and out of contact with the molds.

2. In a glass forming machine, the combination of a rotary mold carriage, molds thereon, a head adapted to cooperate with the molds in succession, automatic means to cause said head to advance with a mold and then return and advance with a succeeding mold, and means for moving said head toward and from the axis of the mold carriage into and out of position over the mold with which it is advancing.

3. In a glass forming machine, the combination of a rotary mold carriage, molds thereon, a head adapted to cooperate with the molds in succession, means to cause said head to advance with a mold and then return and advance with a succeeding mold, and automatic means operable while said head is advancing with a mold to move the head by a separate movement laterally in the plane of its advance with the mold to a position over the mold and to then move it into operative engagement with the mold.

4. In a glass forming machine, the combination of a mold carriage rotatable about a vertical axis, an annular series of molds thereon open at their upper ends to receive charges of glass, a frame mounted to oscillate about said axis, a head carried by said frame, automatic means to periodically advance said frame and cause said head to advance with a mold and to then return and advance with a succeeding mold, and automatic means to shift said head horizontally relative to said frame into and out of a position over the mold with which it is advancing.

5. In a glass forming machine, the combination of a mold carriage, means to rotate it about a vertical axis, a frame, means to oscillate it about said axis, a mold on said carriage, a vertical rock shaft carried by said frame, a head carried by said rock shaft, and means to rock said shaft and swing said head into and out of position over the mold.

6. In a glass forming machine, the combination of a mold carriage, means to rotate it about a vertical axis, a frame, means to oscillate it about said axis, a mold on said carriage, a vertical rock shaft carried by said frame, a head carried by said rock shaft, means to rock said shaft and swing said head into and out of position over the mold, and means to move the head vertically into and out of contact with the mold.

7. In a glass forming machine, the combination of a mold carriage, a mold thereon, a vertical rock shaft, a head thereon, a piston motor arranged to move said shaft vertically and thereby move said head into and out of engagement with the mold, a support for said rock shaft and motor, and means to rock said shaft and thereby swing said head laterally to and from a position over the mold.

8. In a glass forming machine, the combination of a rotary mold carriage, a mold thereon, a vertically disposed rock shaft, means to cause said shaft to advance with the mold, a rack and pinion operable to rotate said shaft, a stationary cam to actuate the rack, means to move said shaft vertically, and a head carried by said shaft and brought into and out of engagement with the mold by said movements of the shaft.

9. In a glass forming machine, the combination of a mold open at its upper end to receive a charge of glass, a guide over the mold and spaced therefrom, a mold closing head, and automatic means to move said head laterally into a position between the mold and said guide and vertically into engagement with the mold while the guide retains said position over the mold, and to reverse said movements and thereby withdraw the said head to permit a charge of glass to pass from said guide into the mold.

10. In a glass forming machine, the combination of a mold, a rock shaft, a rock arm thereon, a head carried by said arm, means to rock said shaft and thereby move said head to and from a position over the mold, means to move the rock shaft vertically while said head is over the mold and thereby move the head into engagement with the mold, and means forming a yielding connection between said head and rock arm.

11. In a glass forming machine, the combination of a mold open at its upper end to receive a charge of glass, a guide above the mold and spaced therefrom, a blowing head movable laterally into and out of an operative position between said guide and mold, means for supplying air under pressure through said blowing head to the mold, and an auxiliary guide carried by said head and movable into operative position between the mold and said first mentioned guide by said lateral movement of the blowing head out of operative position.

12. In a glass forming machine, the combination of a mold carriage, molds thereon, a guide to direct charges of glass into the molds, and a support on which said guide is mounted, said guide being eccentric to its support and rotatively adjustable thereon.

Signed at Toledo, in the county of Lucas and State of Ohio, this 18th day of August, 1921.

LEONARD D. SOUBIER.